United States Patent
Suzuki (12) 
(10) Patent No.: US 6,463,076 B1
(45) Date of Patent: Oct. 8, 2002

(54) COMMUNICATION METHOD, TRANSMITTER, AND RECEIVER

(75) Inventor: Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/035,894

(22) Filed: Mar. 6, 1998

(30) Foreign Application Priority Data

Mar. 12, 1997 (JP) .............................................. 9-057250

(51) Int. Cl.⁷ .................................................. H04J 3/16
(52) U.S. Cl. ...................................... 370/459; 370/528
(58) Field of Search ................................. 370/528, 433, 370/410, 522, 503, 504, 505, 350, 345, 347, 442, 458, 459; 455/63

(56) References Cited

U.S. PATENT DOCUMENTS

| | | | |
|---|---|---|---|
| 4,330,858 | * 5/1982 | Choquet | 370/528 |
| 4,633,464 | * 12/1986 | Anderson et al. | 370/528 |
| 5,060,266 | * 10/1991 | Dent | |
| 5,121,385 | * 6/1992 | Tominaga et al. | 370/528 |
| 5,293,377 | * 3/1994 | Gould | 370/528 |
| 5,425,032 | 6/1995 | Schloss et al. | |
| 5,479,410 | * 12/1995 | Paavonen | |
| 5,499,243 | 3/1996 | Hall | |
| 5,930,263 | * 7/1999 | Nielsen | 370/528 |
| 6,034,987 | * 3/2000 | Chennakeshu et al. | |

FOREIGN PATENT DOCUMENTS

EP          0744842          11/1996          ............ H04B/7/26

* cited by examiner

Primary Examiner—Huy D. Vu
(74) Attorney, Agent, or Firm—Jay H. Maioli (57) ABSTRACT

In a communication method, even when the same channel is used to perform another communication based on the time division multiple access, a signal can avoid continuously suffering interference from the other communication. Idle slots (I) which are not used for communication are inserted between frames at random to change the period of time slots (TS0 to TS3) at random and moreover, a transmission signal is transmitted at timing of time slot (TS0) which is assigned to its own station, out of time slots of which the period is changed at random, thereby even when the same channel is used to perform another communication based on the time division multiple access, it is possible to avoid continuous agreement of the transmission timing with the other communication, so that it is possible to prevent continuous reception of communication interference from the other communication.

16 Claims, 5 Drawing Sheets

FIG. 4A COMUNICATION OF 5A TO 6A

FIG. 4B COMMUNICATION OF 5B TO 6B

COMMUNICATION METHOD, TRANSMITTER, AND RECEIVER

BACKGROUND OF THE INVENTION

1. Field of the Invention

This invention relates to a communication method, a transmitter, and a receiver, and more particularly, is suitably applied to a radio communication system such as a portable telephone system.

2. Description of the Related Art

An area of providing communication service is divided into cells having a predetermined size so that base stations are respectively set in the cells as a fixed radio station, and a portable telephone as a mobile radio station communicates by radio with a base station within the cell in which the portable telephone itself exists. In this case, various communication methods are considered as a communication method between the portable telephone and the base station, and a typical method is a time division multiple access (TDMA) method.

This TDMA method is such that a predetermined frequency channel (hereinafter, simply referred to as a channel) is classified in time with frames having a predetermined time width and moreover, the frames are respectively divided into time slots having a predetermined time width, and the channel is used at a timing of a time slot which is assigned to its own station to transmit a transmission signal. The method realizes a plurality of communication (so-called multiple communication) with the same channel to effectively use frequencies.

However, in a radio communication system using the TDMA system, for example, in the case where the same channel is assigned between adjacent cells and moreover, communication is performed by using the same time slot in terms of time, the same channel interference (that is, two electronic waves having the same frequency interfere with each other at a receiving point to cause interference with each other) may occur to cause communication trouble.

Figure 1:
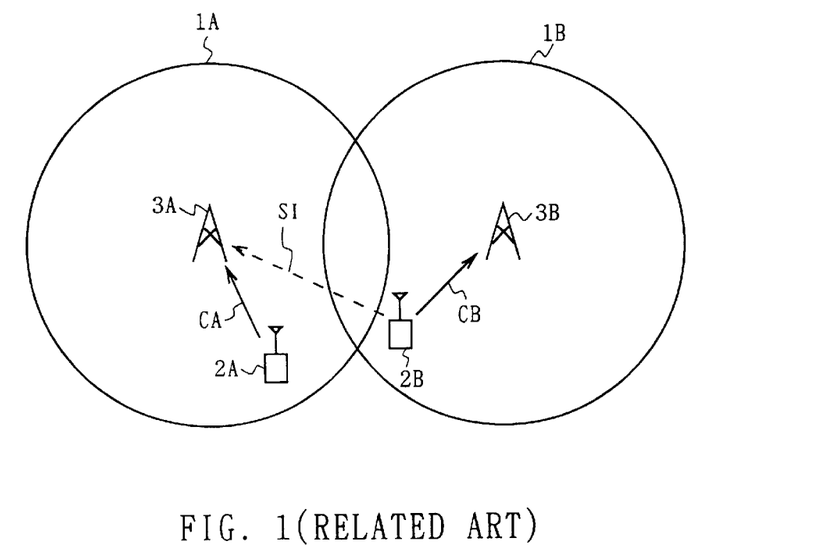
FIG. 1 is a system structure diagram explaining that a transmission signal transmitted in another communication becomes an interference wave.

For example, as shown in FIG. 1, while a portable telephone 2A communicates by radio with a base station 3A using a predetermined channel in a cell 1A, when a portable telephone 2B communicates by radio with a base station 3B by using the same channel in an adjacent cell 1B, it sometimes happens that a transmission signal CB transmitted by the portable telephone 2B reaches the base station 3A. If the transmission signal CB, which has reached the base station 3A, overlaps in timing with a transmission signal CA transmitted from the portable telephone 2A to the base station 3A, it becomes an interference wave SI (so-called trouble wave) against the transmission signal CA and causes trouble to the communication between the portable telephone 2A and the base station 3A.

Figure 2A:
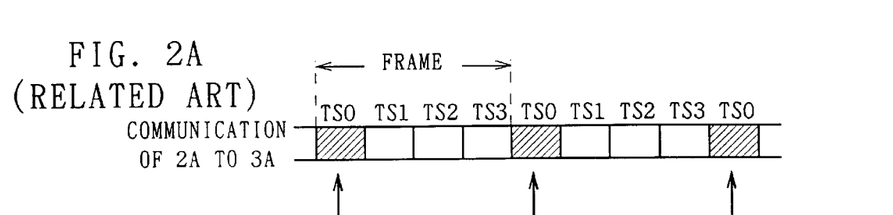
FIGS. 2A and 2B are schematic diagrams explaining the case where the same channel interference continuously occurs because time slots synchronize with those of another communication.
Figure 2B:
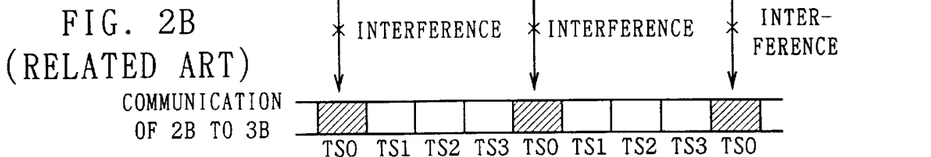

Here, a particular problem in the case of the TDMA method is, as shown in FIGS. 2A and 2B, a case in which the portable telephone 2A and the base station 3A communicate by using a time slot TS0 out of four time slots TS0 to TS3 and the portable telephone 2B and the base station 3B also communicate by using a time slot TS0 which completely overlaps in timing (that is, synchronizes) with the time slot TS0. In this case, each of the time slots are arranged in a regular manner, so that the time slots agree with each other not only at the first time slot TS0 but also at the time slots TS0 after that. In the case where such a situation is generated, the same channel interference occurs at all times to cause continuous trouble to the communication between the portable telephone 2A and the base station 3A, so that the communication quality may be continuously deteriorated and the communication may become impossible in the worst case.

SUMMARY OF THE INVENTION

In view of the foregoing, an object of this invention is to provide a communication method, a transmitter and a receiver which can avoid continuously suffering interference from another communication even when the same channel is used to perform the other communication based on the time division multiple access.

The foregoing object and other objects of the invention have been achieved by the provision of a transmitting method for transmitting a plurality of information in time sharing, wherein the plurality of information is arranged in a predetermined order, information different from the plurality of information is inserted at random between the plurality of information arranged in the predetermined order, and the plurality of information is transmitted to a predetermined transmission channel. Further, a receiving method for receiving information in time sharing receives a signal, demodulates a reception signal, deletes different information inserted at random on a transmitting side, from the demodulation output, and decodes desired information. Furthermore, a transmitter for transmitting a plurality of information in time sharing, comprises first means for arranging the plurality of information in a predetermined order, second means for inserting information different from the plurality of information, at random between the plurality of information arranged in the predetermined order, and transmitting means for transmitting the output to a predetermined transmission channel. Furthermore, a receiver for receiving information in time sharing, comprises receiving means for receiving a signal, demodulating means for demodulating a reception signal, deleting means for deleting different information inserted at random at a transmitting side, from the demodulation output, and decoding means for decoding desired information.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 3:
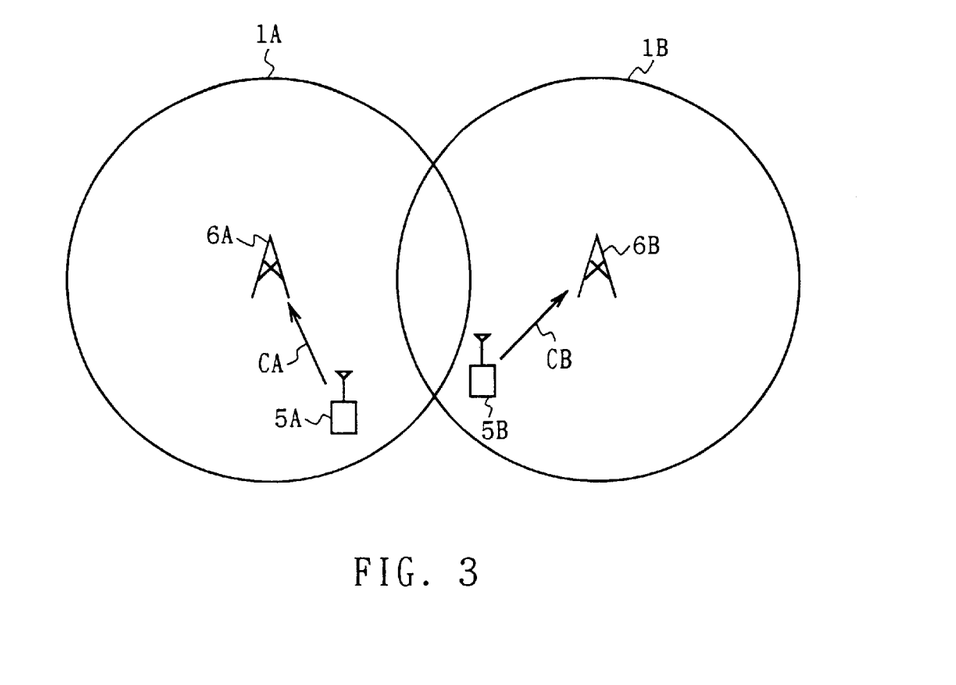
FIG. 3 is a system structure diagram explaining a principle of the present invention.

Preferred embodiments of this invention will be described with reference to the accompanying drawings:

In the beginning, the principle of the present invention will be explained with reference to FIGS. 3 and 4A and 4B. In FIG. 3, numerals 5A and 5B show portable telephones to which the present invention is applied, and numerals 6A and 6B show base stations to which the present invention is applied. At first, as shown in FIG. 3, it is supposed that the portable telephone 5A communicates by radio with the base station 6A by using a predetermined channel in a cell 1A and at the same time, the portable telephone 5B communicates by radio with the base station 6B in an adjacent cell 1B by using the same channel as the predetermined channel. In addition, it is supposed that communications between the portable telephone 5A and the base station 6A and between the portable telephone 5B and the base station 6B are performed based on the TDMA method, and the TDMA method is such that each frame is divided into four time slots TS0 to TS3 as shown in FIGS. 4A and 4B.

Figures 4A, 4B:
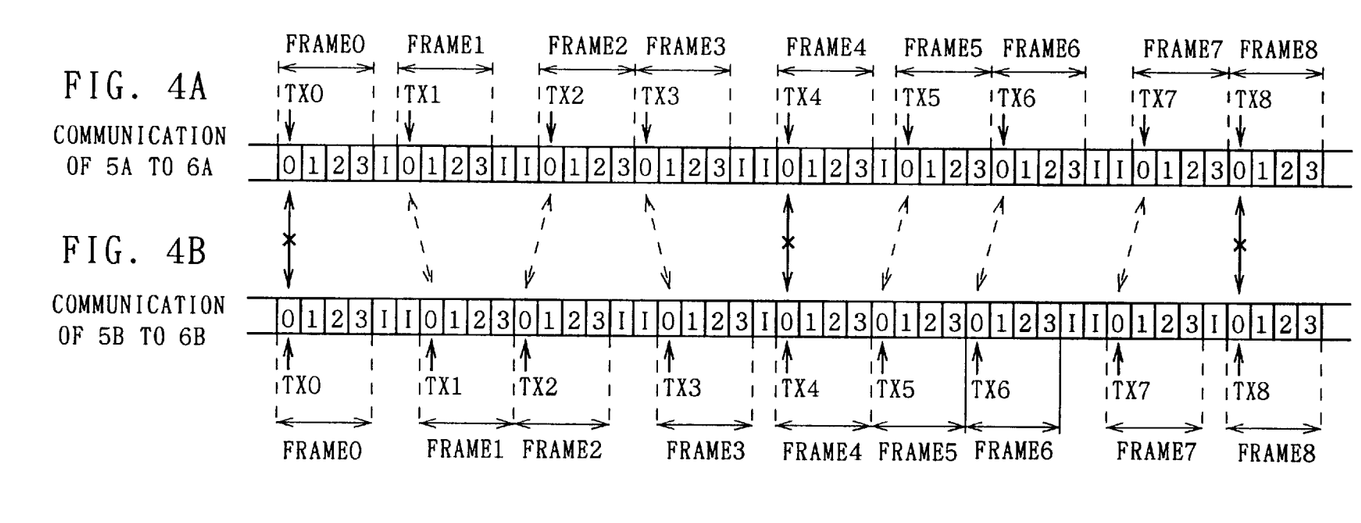
FIGS. 4A and 4B are schematic diagrams showing a slot structure of TDMA system to which the present invention is applied.

Here, in communication from the portable telephone 5A to the base station 6A, as shown in FIG. 4A, the time slots TS0 which are respectively located at the heads of frames are assigned as transmission slots TX0, TX1, . . . , respectively, and at the timing of the time slot TS0, a predetermined channel is used to transmit a transmission signal to the base station 6A. By the way, as shown in FIG. 4A, in the TDMA method slot structure which is applied to the communication between the portable telephone 5A and the base station 6A, idle slots I which are not used for communication and have the same slot length as each of the time slots TS0, TS1, TS2 and TS3 are inserted at random between the frames. For example, one idle slot I is inserted between the frame 0 and the frame 1, and two idle slots I are inserted between the frame 1 and the frame 2. Furthermore, two idle slots I are inserted between the frame 3 and the frame 4, one idle slot I is inserted between the frame 4 and the frame 5, and two idle slots I are inserted between the frame 6 and the frame 7. However, no idle slots are inserted between the frame 2 and the frame 3, between the frame 5 and the frame 6, and between the frame 7 and the frame 8.

In this manner, the idle slots I are inserted at random between the frames, so that each period of the time slots TS0 to TS3 is not repeated in the same period, but is repeated in the period which changes at random. Consequently, even when the time slot TS0 is used as a transmission slot to send a transmission signal to the base station 6A, the transmission timing of the transmission signal do not have regularity as the conventional TDMA method, but changes at random.

Similarly, in the communication from the portable telephone 5B to the base station 6B, as shown in FIG. 4B, the time slots TS0 which are respectively located at the heads of frames are assigned as transmission slots TX0 to TX1, . . . , respectively, and at the timing of the time slot TS0, a predetermined channel is used to send a transmission signal to the base station 6B. Also in the TDMA method slot structure which is applied to the communication between the portable telephone 5B and the base station 6B, idle slots I which are not used for communication and have the same slot length as each of the time slots TS0, TS1, TS2 and TS3 are inserted between the frames at random which is different from the random state in FIG. 4A. For example, two idle slots I are inserted between the frame 0 and the frame 1, and two idle slots I are inserted between the frame 2 and the frame 3. Furthermore, one idle slot is inserted between the frame 3 and the frame 4 and two idle slots I are inserted between the frame 6 and the frame 7, and one idle slot I is inserted between the frame 7 and the frame 8. However, no idle slots I are inserted between the frame 1 and the frame 2, between the frame 4 and the frame 5, and between the frame 5 and the frame 6.

In this manner, since the idle slots I are inserted between the frames at random in the communication between the portable telephone 5B and the base station 6B, each period of the time slots TS0 to TS3 is not repeated in the same period, but is repeated in the period which changes at random. Consequently, even when the time slot TS0 is used as the transmission slot to transmit the transmission signal to the base station 6B, the transmission timing of the transmission signal do not have regularity as the conventional TDMA method, but changes at random.

By the way, in both of the communication between the portable telephone 5A and the base station 6A and the communication between the portable telephone 5B and the base station 6B, the time slots TS0 are used as the transmission slot with the result that the transmission timing of the transmission signal agree at the transmission slots TX0, TX4 and TX8, and the same channel interference occurs. However, in the case of the present invention, each period of the time slots TS0 to TS3 becomes random by inserting the idle slots I between the frames at random. Consequently, the transmission timing of the transmission signal do not agree at the transmission slots TX1, TX2, TX3, TX5, TX6 and TX7, so that the same channel interference is avoided. In this connection, in the case of the related art, as shown in FIG. 1, since each period of the time slots TS0 to TS3 is regular, once the transmission timing agree, the transmission timing always agree after that.

In this manner, in the case of the present invention, each period of the time slots TS0 to TS3 can become random by inserting the idle slots I between the frames at random. Consequently, even when the same time slot TS0 is used in another communication, the agreement of the transmission timing can be avoided every time, so that the continuous occurrence of the same channel interference can be avoided.

Figure 5A:
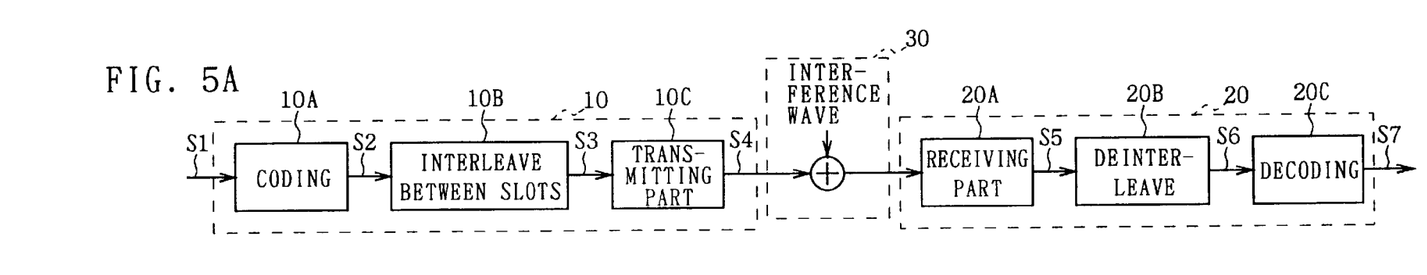
FIGS. 5A and 5B are block diagrams showing structures of a transmitter provided in a portable telephone and a receiver provided in a base station.

Here, concrete structures of the portable telephone 5A (or 5B) and the base station 6A (or 6B) to which such principle of the present invention is applied will be explained below. In FIG. 5A, numeral 10 shows a transmitter provided in the portable telephone 5A (or 5B), and numeral 20 shows a receiver provided in the base station 6A (or 6B). The transmitter 10 roughly comprises a coding circuit 10A, an interleave circuit between slots 10B, and a transmitting part 10C, wherein transmission data S1 supplied via a predetermined sound processing circuit or the like is input to the coding circuit 10A.

The coding circuit 10A comprises a shift register having the predetermined number of steps, and an exclusive OR circuit, in which the input transmission data is subjected to a convolutional coding as a coding for error correction and the resultant transmission data S2 is output to the interleave circuit between slots 10B. The interleave circuit between slots 10B allots the transmission data S2 in accordance with the slot length of the transmission slot (that is, the slot length of the time slot TS0) to rearrange an order of the transmission data S2 so as to extend over a plurality of slots. In the case of this embodiment, the order of the data S2 is rearranged so as to be extended over eight slots of slots TX0 to TX7 (a process for rearranging data is simply referred to as interleave). Then the interleave circuit between slots 10B outputs thus rearranged transmission data S3 to the transmitting part 10C in an order of the slots to which the data is allotted.

The transmitting part 10C is a circuit for generating a transmission signal by overlapping the transmission data S3 onto a predetermined carrier by using a predetermined modulation method and moreover, for transmitting the transmission signal by using the predetermined channel at timing of the transmission slot which is assigned to its own station while controlling the TDMA method slot structure described above. As shown in FIG. 4A, a transmission signal S4 is generated by overlapping one slot of transmission data S3 onto the predetermined carrier at timing of the time slot TS0 which is assigned as a transmission slot, and is transmitted. This transmission signal S4 is transmitted via a transmission channel 30. When the interference wave is present in the midway, the signal reaches the receiver 20 of the base station 6A while suffering the interference wave.

Figure 5B:
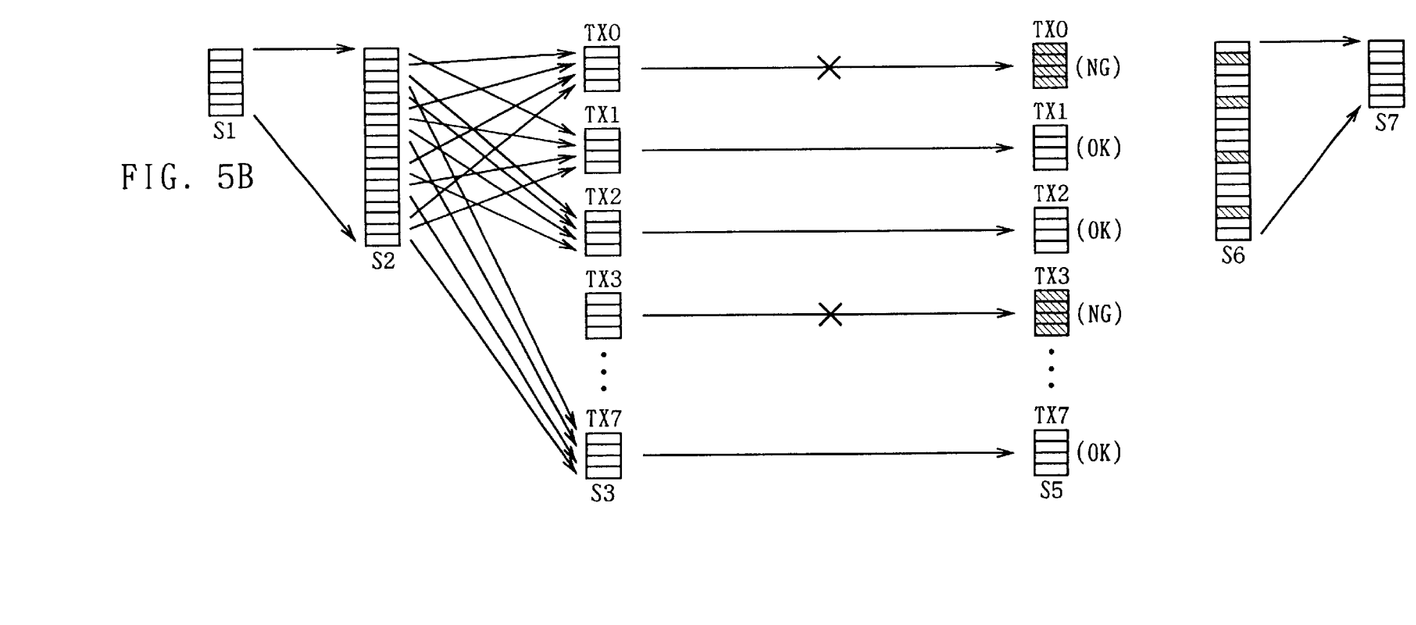

The receiver 20 comprises a receiving part 20A, a deinterleave circuit 20B and a decoding circuit 20C, wherein the transmission signal S4 sent from the transmitter 10 is received with the receiving part 20A. The receiving part 20A grasps the aforementioned slot structure in which each period of the time slots TS0 to TS3 changes at random, and performs a receiving operation at timing of the transmission slot (that is, time slot TS0) which is assigned to the transmitter 10. Thereby, a reception signal corresponding to the transmission signal S4 is obtained and moreover, reception data S5 is restored by applying a predetermined modulation method to the reception signal and is output to the deinterleave circuit 20B in the order of received slots. The deinterleave circuit 20B is a circuit for restoring an arrangement of data which have been rearranged with the interleave circuit between slots 10B of the transmitter 10. When predetermined slots (here, eight slots) of reception data are accumulated, the deinterleave circuit 20B restores the arrangement of the data to the original state, and outputs the resultant reception data S6 to the decoding circuit 20C (hereinafter, a process for restoring the arrangement of the data to the original state is simply referred to as deinterleave).

The decoding circuit 20C is a circuit for decoding for error correction, and for example, comprises a Viterbi decoding circuit for soft judgment, wherein the error correction is performed by applying the Viterbi decoding to the reception data S6 in order to restore reception data S7. Specifically, the decoding circuit 20C restores the reception data S7 free from errors by accumulating a predetermined amount of reception data S6 and considering a tolerance of a convolutional code and assuming the most possible state out of all the transition state which can be assumed as reception data. In this way, finally, the transmission data S1 transmitted from the transmitter 10 is restored as the reception data S7.

In this connection, since the portable telephone 5A (or 5B) and the base station 6A (or 6B) actually perform bi-directional communication, the base station 6A (or 6B) has the transmitter having the same structure as the transmitter 10 shown in FIG. 5A. Besides, the portable telephone 5A (or 5B) has a receiver having the same structure as the receiver 20 shown in FIG. 5A.

By the way, as described above, the TDMA method slot structure in which the idle slots I are inserted at random is formed and controlled by the transmitting part 10C. Here, a method for forming the slot structure will be explained. However, FIGS. 4A and 4B show the example in which eight idle slots I are inserted in all the eight frames. But, here, for the sake of explanation, it is supposed that six idle slots I are inserted in all the eight frames to change the period of the time slot at random.

Figures 6A, 6B:
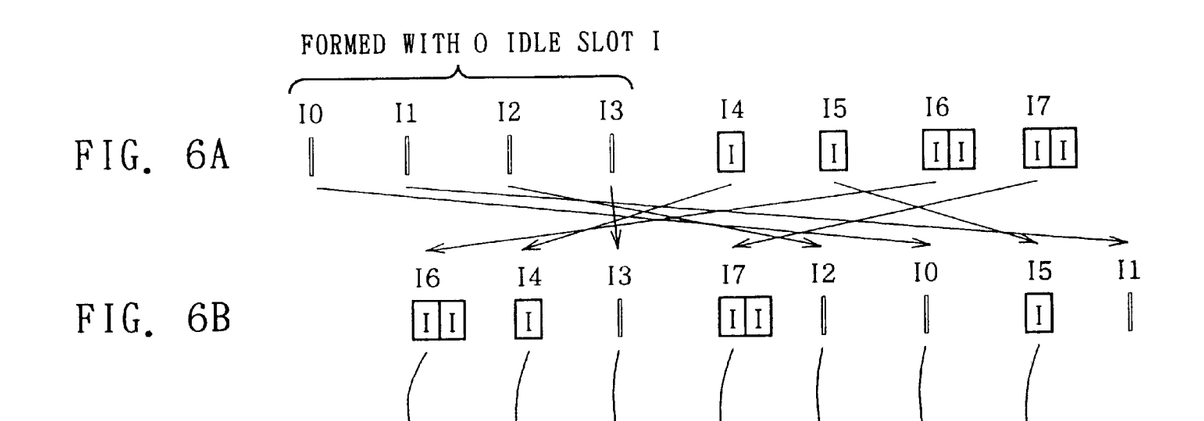
FIGS. 6A to 6D are schematic diagrams explaining a method for inserting idle slots.

At first, as shown in FIG. 6A, the transmitting part 10C prepares idle slots I0 to I3 comprising 0 idle slot, idle slots I4 and I5 comprising one idle slot I and idle slots I6 and I7 comprising two idle slots I. Then the transmitting part 10C rearranges the idle slots I0 to I7 on the basis of random numbers (in this case, the random numbers which are generated here are numbers "0" to "7") generated by a random number generator provided inside. For example, if the order of generated random numbers is "6", "4", "3", "7", "2", "0", "5", "1", the idle slots are rearranged in an order of the idle slot I6, the idle slot I4, the idle slot I3, the idle slot I7, the idle slot I2, the idle slot I0, the idle slot I5, and the idle slot I1, as shown in FIG. 6B. In this connection, the arrangement of the idle slots I0 to I7 shows the positions for inserting the idle slots I and the number of the idle slots to be inserted.

Figures 6C, 6D:
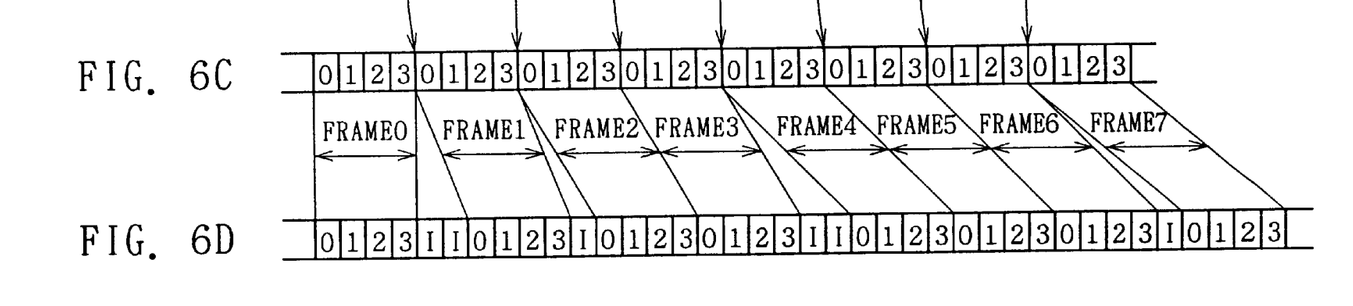

Next, as shown in FIG. 6C, the transmitting part 10C classifies the channel by frames having a predetermined time width and moreover, a regular TDMA method slot structure in which the period of the time slots TS0 to TS3 becomes definite is temporarily formed by dividing each of the frames into slots having a predetermined time width. Then, the idle slots I0 to I7 previously rearranged are inserted into the rear of each of the frames one by one in order. Thereby, as shown in FIG. 6D, the slot structure is formed, in which the idle slots I are inserted at random between the frames. In this connection, since the idle slots I0 to I3 comprise 0 idle slot I, the idle slot I is not inserted in actual. Furthermore, after the frame 7, the slot structure is formed by repeating the same processing.

In this manner, the transmitting part 10C classifies the channel by the frames having a predetermined time width and moreover, a regular TDMA method slot structure in which the period of the time slots TS0 to TS3 becomes definite is temporarily formed by dividing each of the frames into slots having the predetermined time width. Then, the desired number of idle slots is inserted between desired frames in the slot structure in order to form a slot structure in which each period of the time slots TS0 to TS3 changes at random. Then, the transmitting part 10C transmits the transmission signal at timing of the time slot which is assigned to its own station, while controlling the formed slot structure. In this connection, the receiving part 20A also forms and grasps the slot structure by the same processing, and performs the receiving operation at timing of the time slot which is assigned to the transmitter 10.

In the aforementioned structure, in the radio communication system to which the present invention is applied, the slot structure in which the period of the time slots TS0 to TS3 changes at random is formed by inserting the idle slots I, which are not used for communication, between the frames at random. On the basis of the slot structure, the transmission signal is sent at timing of the time slot TS0 which is assigned to its own station. In consequence, since the transmission timing of the transmission signal changes at random, for example, even in the case where the other communication based on the TDMA method is performed by using the same channel in the adjacent cell, the transmission timing of the transmission signal can avoid continuously overlapping with that of the other communication, so that it is possible to prevent communication failure which is caused because communication is continuously interfered.

Furthermore, in the case of this radio communication system, the transmission data S2 is subjected to interleave on the transmitting side and the reception data S5 is subjected to deinterleave on the receiving side. Thereby, even if the same channel interference is generated, an error which is generated by the same channel interference can be converted into a random error, so that the part in which communication quality is deteriorated can be dispersed to perform favorable communication. Furthermore, in addition, the coding for error correction is performed on the transmitting side, and the decoding for error correction is performed on the receiving side, so that high quality communication can be performed by correcting the random error.

This point will be explained by using FIGS. 5A and 5B. At first, the transmission data S1 is input to the coding circuit 10A to be converted into the predetermined number of transmission data S2 by a convolutional coding. The transmission data S2 is rearranged at random so as to extend over the transmission slots TX0 to TX7 with the interleave circuit between slots 10B, and then is transmitted via the transmitting part 10C. The transmission signal S4 transmitted from the transmitting part 10C is transmitted via the transmission channel 30, and is received with the receiving part 20A.

Here, for example, since the timing of the transmission slot TX0 and the timing of the transmission slot TX3 overlap with the transmission timing of another communication, the same channel interference occurs at the transmission slot TX0 and the transmission slot TX3, thereby an error is generated (a slant line in FIG. 5B shows an error part). However, since the reception data S5 obtained by receiving each of the transmission slots is restored to the original state by the deinterleave circuit 20B, the error generated at the transmission slot TX0 and at the transmission slot TX3 is dispersed and converted into a random error. If the error is short like the random error, the error can be corrected by the decoding processing of the decoding circuit 20C. Thus, the reception data S7 free from an error can be restored. In this manner, the interleave is performed on the transmitting side and the deinterleave is performed on the receiving side, and furthermore, the transmission data S1 is coded for error correction on the transmitting side and is decoded for error correction on the receiving side, so that a high quality communication can be performed even when the same channel interference occurs.

Furthermore, in the case of this radio communication system, the channel is classified by the frames having a predetermined time width, and moreover, a regular TDMA method slot structure in which the period of the time slots TS0 to TS3 becomes definite is temporarily formed by dividing each of the frames into the slots having a predetermined time width, and desired number of idle slots is inserted between desired frames in the slot structure, thereby a slot structure in which each period of the time slots TS0 to TS3 changes at random can be easily formed.

According to the aforementioned structure, idle slots I which are not used for communication are inserted between the frames based on the TDMA method to change each period of the time slots TS0 to TS3 at random, thereby if the time slot which is assigned to its own station, out of the time slots TS0 to TS3 is used to transmit the transmission signal, even when another communication based on the TDMA method is performed using the same channel, the transmission timing can prevent continuously agreeing with that of the other communication, so that the transmission signal can prevent continuously suffering communication interference. Consequently, the communication failure due to continuous deterioration of communication quality can be prevented.

Note that, in the aforementioned embodiment, one or two idle slots I are inserted between the frames. However, the present invention is not limited thereto and three idle slots can be inserted between the frames. In brief, as long as each period of the time slots is changed at random by inserting desired number of idle slots I between desired frames, the same advantage as the aforementioned case can be obtained.

Furthermore, in the aforementioned embodiment, the idle slots I have the same slot length as each of the time slots TS0, TS1, TS2 and TS3. However, the present invention is not limited thereto and the idle slots can be two times as long as each of the time slots TS0, TS1, TS2 and TS3. In brief, as long as each period of the time slots TS0 to TS3 is changed at random by inserting the idle slots I, the same advantage as described above can be obtained.

Furthermore, in the aforementioned embodiment, the convolutional coding is used as coding for error correction and the Viterbi decoding is used as decoding for error correction. However, the present invention is not limited thereto and BCH (Bose-Chaudhuri-Hocquenghem) coding and the corresponding block decoding can be used. Otherwise, convolutional coding and the threshold value decoding or a consecutive decoding can be used.

Furthermore, in the aforementioned embodiment, each period of the time slots is changed at random to prevent the transmission timing from agreeing with that of another communication. However, the present invention is not limited thereto and this method of changing each period of the time slots at random and the frequency hopping method of changing the channel to be used at random every predetermined time can be combined. Thereby, a probability of the occurrence of the same channel interference can be reduced further.

Furthermore, in the aforementioned embodiment, the present invention is applied to the TDMA method radio communication system having four slots structure in which each of the frames is divided into four time slots. However, the present invention is not limited thereto and the same advantage as described above can be obtained in a case where the present invention is applied to the TDMA method having a slot structure in which each frame is divided into three or eight time slots. In brief, as long as a radio communication system of a communication method in which the frame is divided into slots having a predetermined time width to form plural time slots and the channel is used at timing of a time slot which is assigned to its own station to transmit a transmission signal, the present invention can be widely applied.

As described above, according to the present invention, the idle slots which are not used for communication are inserted at random between the frames to change the period of time slots at random and moreover, a transmission signal is transmitted at timing of a time slot which is assigned to its own station, out of the time slots of which the period is changed at random. Thereby, even when the same channel is used to perform another communication based on the time division multiple access, the transmission timing can be avoided continuously agreeing with that of the other communication, so that the transmission signal can be prevented from continuously suffering communication interference from the other communication.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitting method of transmitting a plurality of information using time sharing, comprising the steps of:

arranging said plurality of information in a predetermined order;

performing error correction processing on said plurality of information;

performing interleave processing on said plurality of information;

inserting information different from said plurality of information at random between said plurality of information arranged in said predetermined order after the error correction and interleave processing, wherein said plurality of information and said different information have a time slot structure wherein a plurality of time slots of the plurality of information form a frame and a non-negative integer number of slots of said different information are inserted at random after each frame of the plurality of information; and transmitting said plurality of information with said different information inserted at random therebetween to a predetermined transmission channel, such that a period of the plurality of information varies to prevent interference with information transmitted by another transmitter that is transmitting using time sharing.

2. The transmitting method according to claim 1, wherein said time slots have a same length.

3. The transmitting method according to claim 2, wherein said different information comprises a non-negative integer number of idle slots which do not include effective information.

4. The transmitting method according to claim 3, wherein said steps of performing error correction processing and interleave processing extend for a plurality of slots on said plurality of information and are performed before inserting said different information at random between said plurality of information.

5. A receiving method for receiving information transmitted using time sharing, comprising the steps of:

receiving a signal that includes a plurality of desired information and different information inserted at random between said plurality of desired information, wherein the desired information and the different information have a time slot structure wherein a plurality of time slots of desired information form a frame and a non-negative integer number of slots of different information are randomly inserted after each frame of desired information, such that a period of the desired information in the received signal is varied to avoid interference from another received signal transmitted using time sharing;

demodulating the received signal and supplying a demodulation output therefrom;

deleting said different information inserted at random on a transmitting side from said demodulation output;

performing deinterleaving processing to reverse interleave processing performed on a transmission side; and decoding said plurality of desired information after deinterleaving processing is performed.

6. The receiving method according to claim 5, wherein said time slots have a same length.

7. The receiving method according to claim 6, wherein the number of said different information comprises a randomly selected non-negative integer number of idle slots which do not include effective information.

8. The receiving method according to claim 7, wherein the steps of performing deinterleave processing to reverse interleave processing which extends for a plurality of slots on a transmitting side is performed after deleting said different information from said demodulation output.

9. A transmitter for transmitting a plurality of information using time sharing, comprising:

first means for arranging said plurality of information in a predetermined order;

means for performing error correction processing on said plurality of information;

means for providing interleave processing on said plurality of information;

second means for inserting information different from said plurality of information at random between said plurality of information arranged in said predetermined order after the error correction and interleave processing, wherein said plurality of information and said different information have a time slot structure wherein a plurality of time slots of the plurality of information form a frame and a non-negative integer number of slots of said different information are inserted at random after each frame of the plurality of information; and transmitting means for transmitting said plurality of information with said different information inserted therebetween to a predetermined transmission channel, such that a period of the plurality of information varies to prevent interference with information transmitted by another transmitter that is transmitting using time sharing.

10. The transmitter according to claim 9, wherein said time slots have a same length.

11. The transmitter according to claim 10, wherein said different information comprises a randomly selected non-negative integer number of idle slots which do not include effective information.

12. The transmitter according to claim 11, wherein the error correction processing and interleave processing extend for a plurality of slots on said plurality of information and are performed before inserting said different information at random between said plurality of information.

13. A receiver for receiving information transmitted using time sharing, comprising:

receiving means for receiving a signal that includes a plurality of desired information and different information inserted between said plurality of desired information, wherein the desired information and the different information have a time slot structure wherein a plurality of time slots of desired information form a frame and a non-negative integer number of slots of different information are randomly inserted after each frame of desired information, such that a period of the desired information in the received signal is varied to avoid interference from another received signal transmitted using time sharing;

demodulating means for demodulating the received signal and supplying a demodulation output therefrom;

deleting means for deleting different information inserted at random on a transmitting side, from said demodulation output;

deinterleave processing means for reversing interleave processing performed on the transmitting side; and decoding means for decoding said plurality of desired information after deinterleave processing is performed.

14. The receiver according to claim 13, wherein said time slots have a same length.

15. The receiver according to claim 14, wherein said different information comprises a randomly selected non-negative integer number of idle slots which do not include effective information.

16. The receiver according to claim 15, wherein the deinterleave processing to reverse interleave processing extending for a plurality of slots on a transmitting side is performed after deleting said different information from said demodulation output.

* * * * *